United States Patent Office 3,352,888
Patented Nov. 14, 1967

3,352,888
ORGANOMETALLO-SEMICONDUCTING
MATERIALS
Yoshio Matsunaga, Stamford, Conn., assignor to American Cyanamid Company, Stamford, Conn., a corporation of Maine
No Drawing. Filed Nov. 2, 1964, Ser. No. 408,341
5 Claims. (Cl. 260—396)

ABSTRACT OF THE DISCLOSURE

The present invention relates to novel organometallo-semiconducting complexes. More particularly, it relates to semiconducting-organometallo molecular complexes of the ionic or dative type. Still more particularly, the invention is concerned with novel low-resistance, semiconducting organometallo-molecular complexes derived from both metallocenes comprising electron donors and tetrahalo-p-diphenoquinones comprising electron acceptors having the structure:

$$[D]^+[A]_2^-$$

wherein D is a metallocinium moiety selected from the group consisting of ferricinium and cobalticinium and A is a tetrahalogeno-p-diphenoquinone moiety selected from the group consisting of tetrachloro-p-diphenoquinone and tetrabromo-p-diphenoquinone.

---

The molecular complexes as prepared in the present invention possess enhanced semiconducting properties. They are characterized as low-resistance semiconductors highly useful in solid state devices exemplified by transistors, rectifiers, diodes, photocells, thermocouples and radiation detectors.

As is known, there is a paucity of organic semiconductive materials of simple molecular structures exhibiting resistivities of less than 100 ohm-cm. To provide the art with low-resistance organic semiconductive materials which are relatively simple in molecular configuration would satisfy an ever growing need.

It is, therefore, a principal object of the invention to provide novel molecular complexes which can be characterized as having both relatively simple molecular structures and low resistivities. It is a further object to provide a straightforward process for preparing organic semiconductive materials of low resistivity and comparative simple molecular structures. These and other objects will become apparent from a consideration of the ensuing detailed description.

According to the present invention, there is provided novel molecular complexes which are characterized by the formula:

$$[D]^+[A]_2^-$$

in which D represents an electron donor, more specifically a metallocene or metallocinium moiety and A represents the electron acceptor, more specifically, a tetrahalogeno-p-diphenoquinone moiety.

Illustrative metallocinium moieties represented by the above formula are, for instance, derivable from either ferrocene or cobaltocene. As ions, these moieties are more properly termed ferricinium or cobalticinium.

The tetrahalogeno-p-diphenoquinone moieties can be represented by the formula:

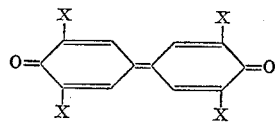

wherein X is either chlorine or bromine. Contemplated as exemplary are: tetrachloro-p-diphenoquinone; tetrabromo-p-diphenoquinone; dichloro-dibromo-p-diphenoquinone; and monobromo-trichloro-p-diphenoquinone.

The molecular semiconducting complexes hereinabove defined can be prepared in a straightforward manner by mixing the components comprising each of the moieties of the complexes. for instance, one mol of ferrocene can be reacted at room temperature with two mols of a tetrahalogeno-p-diphenoquinone in the presence of a solvent for the mixture to recover ferrocene–tetrahalogeno-p-diphenoquinone (1:2) complex. Alternatively, complexes of the present invention can be prepared, for instance, by reacting one mol of a ferricinium trihalide with one mol of a tetrahalogeno-diphenoquinone and one mol of an alkali metal salt of a tetrahalogeno-p-diphenosemiquinone.

The overall reactions may be graphically written as follows:

(A) 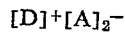 + 2Q or (B) 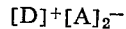 + Q⁻ + Q

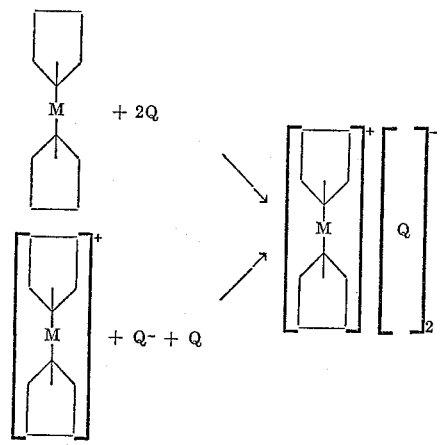

where M is either iron or cobalt, Q represents a tetrahalogenodiphenoquinone and Q⁻ represents the latter's corresponding semiquinone ion.

In general, the reactions outlined above are preferably carried out in a common solvent for each of the respective reactants. Such solvents are, for instance, acetone, acetonitrile or benzene. However, when cobaltocene is employed as the reactant, an inert atmosphere such as a nitrogen or argon atmosphere should also be provided, since cobaltocene is relatively unstable in the atmosphere. Thus, Reaction (B) is a preferred procedure when reacting cobalticinium trihalide, tetrahalogeno-p-diphenoquinone and the alkali metal salt of tetrahalogeno-p-diphenosemiquinone, each component being present in equimolar amounts. While cobaltocene is relatively unstable in the atmosphere, cobalticinium trihalide is stable.

Advantgeously, temperatures ranging from about 20° C. to 40° C. are contemplated, although higher or lower temperatures can be used, if desired. Special equipment is not required to carry out the novel process since the reaction usually takes place under atmospheric pressure. Pressure equipment can be used where an inert atmosphere must be provided due to the instability of a reactant. However, with respect to the reactions involving ferrocene, no special precautions are taken, since ferrocene is quite stable to oxidation.

The following examples are presented merely by way of illustration and are not to be deemed limitative of the present invention. All parts are by weight unless otherwise specified.

Example 1

Preparation of ferrocene–tetrachloro-p-diphenoquinone (1:2) complex which can be written as:

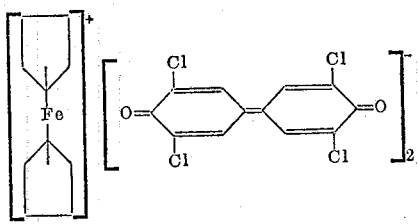

To a suitable reaction vessel containing 0.63 part of ferrocene in 100 parts of acetone is added 1.28 parts of pulverized tetrachloro-p-diphenoquinone. Stirring the mixture for 5 minutes there is recovered a black product which is immediately precipitated. This product is filtered and washed with acetone. Upon analysis, the following data is obtained.

Calcd. for $(C_{10}H_{10}Fe)(C_{12}H_4Cl_4O_2)_2$: C, 49.2%; H, 2.2%; Cl, 34.4%. Found: C, 49.4%; H, 2.1%; Cl, 34.4%.

Example 2

To a suitable reaction vessel containing 2.27 parts of ferricinium triiodide prepared by reacting ferrocene with 1.5 mols of iodine and 1.04 parts of the sodium salt of tetrachloro-p-diphenosemiquinone are mixed in 50 parts of acetonitrile and stirred for one hour. Resultant product is filtered and washed with additional acetone and upon analysis there is recorded:

Calcd. for $(C_{10}H_{10}Fe)(C_{12}H_4Cl_4O_2)_2$: C, 49.2%; H, 2.2%; Cl, 34.4%. Found: C, 48.9%; H, 2.4%; Cl, 33.6%.

Example 3

To a suitable reactor containing 0.40 part of ferrocene are added 2.0 parts of tetrabromo-p-diphenoquinone in 100 parts of acetone. A visible reaction quickly occurs in that a black product is formed. The product is filtered and washed with additional acetone. A good yield of ferrocene–tetrabromo-p-diphenoquinone (1:2) complex approximating 95% desired complex based on the quinone is obtained and upon analysis, the following is recorded.

Calcd. for $(C_{10}H_{10}Fe)(C_{12}H_4Br_4O_2)_2$: C, 34.4%; H, 1.5%; Br, 53.9%. Found: C, 34%; H, 1.5%; Br, 54.6%.

Example 4

To a glass reaction vessel is added 1.71 parts of cobalticinium triiodide, 0.97 part of tetrachloro-p-diphenoquinone and 1.05 parts of the sodium salt of tetrachloro-p-diphenosemiquinone and admixed in 50 parts of acetonitrile while stirring for ½ hour. Resultant black product is filtered and washed with acetone. A yield of 1.8 parts of cobaltocene–tetrachloro-p-diphenoquinone (1:2) complex is obtained.

Calcd. for $(C_{10}H_{10}Co)(C_{12}H_4Cl_4O_2)_2$: C, 49.0%; H, 2.2%; Cl, 34.0%. Found: C, 48.1%; H, 2.1%; Cl, 33.9%.

In determining the resistivity of the complexes prepared by the present invention, a four probe method is employed. A compressed complex having a ⅜" diameter is mounted on a resistivity test device (model B, manufactured by A & M Fell, Ltd., England), and the resistivity is read directly using a Keithyl (model 502) milliohm-meter.

Advantageously, the electrical resistivity of each of the complexes prepared above, measured at room temperature, do not exceed 30 ohm-cm. Substantially no increase of the resistivity of, for instance, the cobaltocene complex even after ten months after preparation is observed.

I claim:

1. An organometallo molecular complex of the formula:

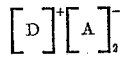

wherein D is a metallocinium moiety selected from the group consisting of ferricinium and cobalticinium and A is a tetrahalogeno-p-diphenoquinone moiety selected from the group consisting of tetrachloro-p-diphenoquinone and tetrabromo-p-diphenoquinone.

2. The compound: ferrocene–tetrachloro-p-diphenoquinone (1:2).

3. The compound: ferrocene–tetrabromo-p-diphenoquinone (1:2).

4. The compound: cobaltocene–tetrachloro-p-diphenoquinone (1:2).

5. The compound: cobaltocene–tetrabromo-p-diphenoquinone (1:2).

References Cited

UNITED STATES PATENTS 3,255,392    6/1966    Wahlig _____ 317—234

LORRAINE A. WEINBERGER, *Primary Examiner.*

L. THAXTON, *Assistant Examiner.*